United States Patent
Sugimoto et al.

(10) Patent No.: US 6,687,608 B2
(45) Date of Patent: Feb. 3, 2004

(54) INFORMATION NOTIFICATION SYSTEM AND METHOD, AND NAVIGATION SYSTEM AND METHOD

(75) Inventors: Mika Sugimoto, Asaka (JP); Mikio Watanabe, Asaka (JP); Sugio Makishima, Tokyo (JP); Yoshiki Kawaoka, Asaka (JP); Yasuhiro Shinkai, Asaka (JP); Asa Namiki, Tokyo (JP); Toshihiko Kaku, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 42 days.

(21) Appl. No.: 10/025,582

(22) Filed: Dec. 26, 2001

(65) Prior Publication Data

US 2002/0087266 A1 Jul. 4, 2002

(30) Foreign Application Priority Data

Dec. 27, 2000 (JP) ........................ 2000-397731
Jan. 5, 2001 (JP) ........................ 2001-000757

(51) Int. Cl.⁷ .............................. G06F 19/00
(52) U.S. Cl. .................. 701/207; 701/211; 701/213; 340/990; 340/995.1; 340/995.24
(58) Field of Search ................. 701/207, 208, 701/211, 213, 200; 340/990, 995, 995.1, 995.16, 995.17, 995.18, 995.23, 995.24, 996; 342/357.13; 709/203

(56) References Cited

U.S. PATENT DOCUMENTS

| | | | | |
|---|---|---|---|---|
| 5,543,789 A | * | 8/1996 | Behr et al. | 340/995 |
| 5,559,707 A | * | 9/1996 | DeLorme et al. | 701/200 |
| 5,682,525 A | * | 10/1997 | Bouve et al. | 707/104.1 |
| 5,740,549 A | * | 4/1998 | Reilly et al. | 705/14 |
| 5,802,492 A | * | 9/1998 | DeLorme et al. | 455/456 |
| 6,006,251 A | * | 12/1999 | Toyouchi et al. | 709/203 |
| 6,148,260 A | * | 11/2000 | Musk et al. | 701/200 |
| 6,182,050 B1 | * | 1/2001 | Ballard | 705/14 |
| 6,202,023 B1 | * | 3/2001 | Hancock et al. | 701/201 |
| 6,317,718 B1 | * | 11/2001 | Fano | 705/1 |
| 6,321,158 B1 | * | 11/2001 | DeLorme et al. | 701/201 |

FOREIGN PATENT DOCUMENTS

JP          9-269923       10/1997

* cited by examiner

Primary Examiner—Michael J. Zanelli
Assistant Examiner—Eric M Gibson
(74) Attorney, Agent, or Firm—McGinn & Gibb, PLLC

(57) ABSTRACT

Inputting a profile of a user; detecting a current position of the user; previously recording service information on shops or the like in a recording device associated with the current position of the user and the profile of the user; and retrieving and selecting the service information on the shops or the like recorded in the recording device according to the inputted profile and the detected current position of the user to notify the user permit providing appropriate service information required by the user to the user by a push type information notification system. There are also provided a storing device which previously stores destination information matching a date, a time period, a cost, number of persons, a purpose or the like in action, associated with user information on an age, a sex or a preference of the user; an input device through which the user inputs his profile such as the preference; a processing device which selects a destination or action information on an action order or the like associated with the profile from the destination information stored in the storing device according to a predetermined algorithm; and a notifying device (display device) which notifies the user of the selected action information, thereby permitting successively notifying the user of destinations and action instructions.

78 Claims, 15 Drawing Sheets

DESIRED INFORMATION

- ☐ SHOPPING
- ☐ MOVIE
- ☐ RESTAURANT
- ☐ PUB
- ☐ CAFE
- ☐ ENTERTAINMENT
- ☐ TIMETABLE

TRANSMIT AT ☐ HOURS INTERVAL

[ OK ]  [ Cancel ]

FIG.6
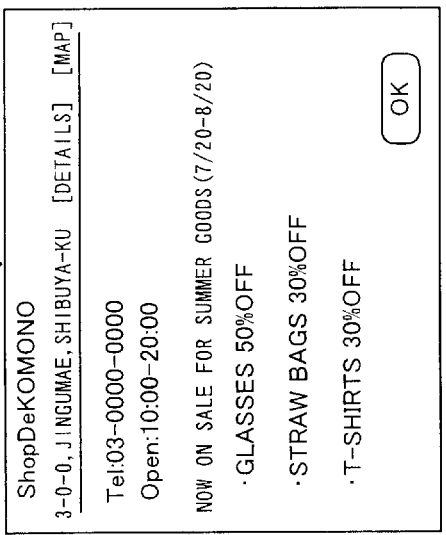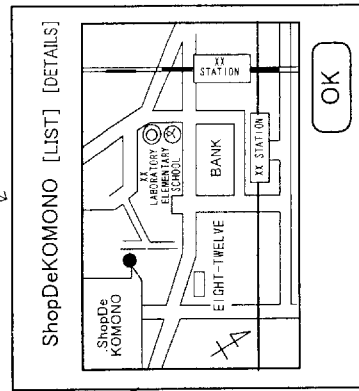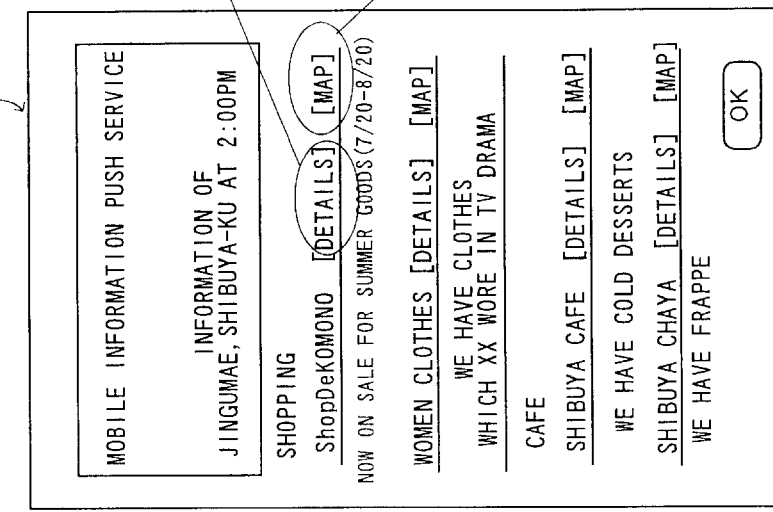

MOBILE INFORMATION PUSH SERVICE   OWNER REGISTRATION PAGE

COMPANY NAME/
LEGAL PERSON NAME :
NAME
(PERSON IN CHARGE) :
ADDRESS  PREFECTURE :
         CITY :
TEL :
FAX :
E-MAIL :
PASSWORD :
PASSWORD
(CONFIRMATION) :

OK    Cancel

OWNER ID:1234    MR.XXXX

LIST OF REGISTERED SHOPS

| SHOP ID | SHOP NAME | DETAILS/CORRECT | DELETE |
|---------|-----------|-----------------|--------|
| 1234-00 | XX RESTAURANT AOYAMA | [DETAILS/CORRECT] | [DELETE] |
| 1234-01 | XX RESTAURANT HARAJUKU | [DETAILS/CORRECT] | [DELETE] |
| 1234-02 | XX CAFE DAIKANYAMA | [DETAILS/CORRECT] | [DELETE] |
| 1234-03 | XX CHINESE RESTAURANT SHINAGAWA | [DETAILS/CORRECT] | [DELETE] |

OWNER INFORMATION CONFIRM/CORRECT       NEW       OK       Cancel

FIG.9

```
          MOBILE INFORMATION PUSH SERVICE
              SHOP REGISTRATION PAGE
```

OWNER ID : 1234        MR.XXXX

SHOP NAME : [        ]

SHOP ADDRESS
PREFECTURE : [        ▽]

CITY : [        ▽]

[              ]

SHOP TEL : [        ]

SHOP FAX : [        ]

SHOP URL : [              ]

SHOP OPENING TIME : FROM [    ▽] TO [    ▽]

SHOP CATEGORY : [        ▽]

SHOP FEATURE(WITHIN 150 CHARACTERS) :

[              ]

( OK )  ( Cancel )

USER INFORMATION DATABASE

| USER | USER INFORMATION | | | | | | |
|---|---|---|---|---|---|---|---|
| | ADDRESS | AGE | SEX | PORTABLE TELEPHONE | CURRENT POSITION | HOBBY AND PREFERENCE | PURPOSE |
| TARO YAMADA | XX, TOKYO | 21 | ♂ | 090-XXXX-XXXX | XX, MINATO-KU, TOKYO | SPORTS | SKI |
| ICHIRO FUJI | XX, SAITAMA | 35 | ♂ | 090-XXXX-XXXX | XX, SHIBUYA-KU, TOKYO | WESTERN DISHES GOURMET | DATING |
| HANAKO YAMADA | XX, OKINAWA | 18 | ♀ | 090-XXXX-XXXX | XX, CHUO-KU, TOKYO | MOVIE | SHOPPING |
| ⋮ | ⋮ | ⋮ | ⋮ | ⋮ | ⋮ | ⋮ | ⋮ |

FIG.12

DESTINATION INFORMATION DATABASE

| SHOP NAME | SHOP INFORMATION ||||||||
|---|---|---|---|---|---|---|---|---|
| | ADDRESS/ STATION | PREFERENCE GENRE | SUITABLE AGE BRACKET | COST RANGE | USER EVALUATION | EXAMPLE OF PURPOSE | TIME PERIOD, DATE | NUMBER OF PERSONS |
| RESTAURANT A | XX,TOKYO | WESTERN DISHES | AGE OF 20 TO 50 | 1000~2000YEN | 70/100 | DATING | ... | ~4 |
| B CHINESE RESTAURANT | XX,TOKYO | CHINESE DISHES | AGE OF 35 TO 60 | 1000~2000YEN | 35/100 | TRAVEL | ... | ~20 |
| CAFE BAR C | XX, KANAGAWA | CAFE BAR | AGE OF 18 TO 30 | 1000~2000YEN | 60/100 | TALKING | ... | ~3 |
| ... | ... | ... | ... | ... | ... | ... | ... | ... |

FIG.13

ENVIRONMENTAL INFORMATION DATABASE

| ENVIRONMENTAL ITEM | DESTINATION | | | | |
|---|---|---|---|---|---|
| | CHUO-KU, TOKYO | MINATO-KU, TOKYO | CHIYODA-KU, TOKYO | SHIBUYA-KU, TOKYO | SHINJUKU-KU, TOKYO |
| TEMPERATURE | 18.5°C | 18.2°C | 18.0°C | 18.4°C | 17.9°C |
| WEATHER | CLOUDY | SUNNY | CLOUDY | CLOUDY | CLOUDY |
| TRANSPORTATION INFORMATION | CROWDED | ... | ... | ... | ... |

FIG.14

DESTINATION CALCULATING METHOD

| DESTINATION | USER OPTIMUM EVALUATION | | ENVIRONMENT OPTIMUM EVALUATION | | | | DESTINATION INFORMATION | | EVALUATION VALUE |
|---|---|---|---|---|---|---|---|---|---|
| | SEX ♂ | AGE OF 30 TO 35 | 18:00~22:00 TIME:EVENING | MOVEMENT DISTANCE | WEATHER: SUNNY | ... | CROWDING LEVEL | ... | |
| SHOP A | 70 | 100 | 100 | 30 | 100 | ... | 20 | ... | 60 |
| SHOP B | 30 | 100 | 100 | 80 | 100 | ... | 80 | ... | 72 |
| SHOP C | 60 | 70 | 100 | 90 | 100 | ... | 80 | ... | 85 |
| ... | ... | ... | ... | ... | ... | ... | ... | ... | ... |

INFORMATION NOTIFICATION SYSTEM AND METHOD, AND NAVIGATION SYSTEM AND METHOD

BACKGROUND OF THE INVENTION

1. Field of the Invention

The present invention relates to an information notification system and a method thereof as well as a navigation system and a method thereof, and more particularly to an information notification system and a method thereof which displays service information on shops or the like on a portable terminal and notifies a user, as well as a navigation system and a method thereof which notifies a future destination or route of the user.

2. Description of the Related Art

Portable communication terminals (hereinafter referred to as "portable terminals") such as mobile telephones, PDA (Personal Data Assistance) and PIM (Personal Information Manager) have remarkably become widespread. Some of such portable terminals known are capable of using information delivery service via the Internet in addition to essential functions such as calling or recording of schedules.

Japanese Patent Application Publication No. 9-269923 discloses an information and advertising distribution system and method which distribute information matching subscriber's interests to subscriber's computer during time periods in which the subscriber's computer is inactive. However, there is a problem such that the system can be used simply for displaying delivered information on a screen saver or the like since the system does not retrieve and deliver information desired by a user.

Also known is an information delivery system where a user can input keywords for retrieval in a mobile telephone and retrieve desired service information on shops or the like, which has a problem such that the user himself has to input many appropriate keywords for obtaining shop information or the like desired by the user from enormous pieces of shop information or the like.

Such portable terminals have been increasingly miniaturized, and especially portable terminals such as portable telephones or the like without full keyboards have a problem such that a method of inputting characters are still complicated. Also, use of the Internet by a conventional information terminal is a part of use of the Internet by a personal computer or the like, and full advantage is not taken of features of the Internet by the conventional information terminal.

When previously checking a travel itinerary or a romantic itinerary for couples, sightseeing places, restaurants, routes or the like matching a desired or expected situation have been decided with reference to guide books or town information magazines.

Also known is a service such that a service provider receives positional information obtained by a mobile telephone, a personal handyphone system (PHS), or the like, from retrieval information using the Internet, and provides information or a menu matching a current position of a user in real time.

However, if sightseeing places or routes are checked with reference to information in guide books, town information magazines, travel guides, romantic itinerary guides for couples, or the like, real time information cannot be obtained since such guide books or the like contain past old information. This causes a problem such that when actually visiting the places, situations thereof are changed, and a travel cannot be achieved as expected. Further, there is also a problem such that the information in the guidebook is preset information, and does not match user's feeling or wish in many cases.

In receiving retrieval information using the Internet, there is a possibility that information or a menu matching the current position of the user can be obtained in real time, but each piece of information is independent, and the user himself has to selectively combine independent pieces of information which are not related to one another. That is, the user has to combine point information on each place with route information and time information for making a plan.

Therefore, the user himself has to make a plan for the itinerary or service, and there is a problem such that the user cannot make the plan for the itinerary or service well without knowledge to some extent on destination information or route information. There is also a problem such that current information matching the current position can be obtained, but current information on a destination cannot be obtained.

SUMMARY OF THE INVENTION

The present invention is achieved in view of the above described circumstances, and has its object to provide an information notification system and a method thereof which can provide appropriate service information required by a user according to a current position or an age of the user, time, or the like by a push type information notification system.

In order to attain the above described object, the present invention is directed to an information notification system which notifies a user of service information on shops or the like according to a current position of the user and a profile of the user, including: a first input device through which the user inputs his profile such as a sex, a birthday or an occupation; a position detecting device which detects the current position of the user; a recording device which previously records the service information on the shops or the like associated with the current position of the user and the profile information on the sex, the age and the occupation of the user; a retrieving device which retrieves and selects the service information on the shops or the like recorded in the recording device according to the inputted profile and the detected current position of the user; and a display device which displays the selected service information and notifies the user.

According to the invention, there are provided the first input device through which the user inputs his profile such as the sex, the birthday or the occupation; the position detecting device which detects the current position of the user; the recording device which previously records the service information on the shops or the like associated with the current position of the user and the profile information on the sex, the age, and the occupation of the user; the retrieving device which retrieves and selects the service information on the shops or the like recorded in the recording device according to the inputted profile and the detected current position of the user; and the display device which displays the selected service information and notifies the user, thereby permitting providing appropriate service information required by the user to the user by a push type information notification system.

The present invention is achieved in view of the above described situations, and has its object to provide a navigation system and a method thereof which successively notifies a user of destinations and action instructions when the user inputs a destination or purpose action in a portable terminal.

In order to attain the above described object, the present invention is directed to a navigation system which notifies a future destination of a user, including: a storing device which previously stores destination information matching a date, a time period, a cost, number of persons, transportation, evaluation information, a purpose or the like in action by the user, associated with user information on an age, a sex or a preference of the user; an input device through which the user inputs his profile such as the age, the sex or the preference; a processing device which selects a destination or action information on an action order or the like associated with the inputted profile from the destination information stored in the storing device according to a predetermined algorithm; and a notifying device which notifies the user of the selected action information.

According to the invention, there are provided the storing device which previously stores the destination information matching the date, the time period, the cost, the number of persons, or the transportation, the evaluation information, the purpose or the like in the action by the user, associated with the user information on the age, the sex or the preference of the user; the input device through which the user inputs his profile such as the age, the sex or the preference; the processing device which selects the destination or the action information on the action order or the like associated with the inputted profile from the destination information stored in the storing device according to the predetermined algorithm; and the notifying device which notifies the user of the selected action information, thereby permitting successively notifying the user of destinations and action instructions when the user inputs a destination or purpose action in a portable terminal.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 3 is a view of a received information selection screen on which the user selects desired information;

FIG. 6 is a view of a detailed display of service information;

FIG. 7 is a view of an owner registration page;

FIG. 8 is a list display of registered shops;

FIG. 9 is a view of a shop registration page;

FIG. 11 is a diagram showing a user information database inputted by the user;

FIG. 12 is a diagram showing a destination information database;

FIG. 13 is a diagram showing an environmental information database transmitted from destinations;

FIG. 14 is a diagram showing destinations calculated by a predetermined algorithm.

DETAILED DESCRIPTION OF THE PREFERRED EMBODIMENTS

A preferred embodiment of an information notification system and a method thereof according to the invention will be described below with reference to the appended drawings.

Figure 1:
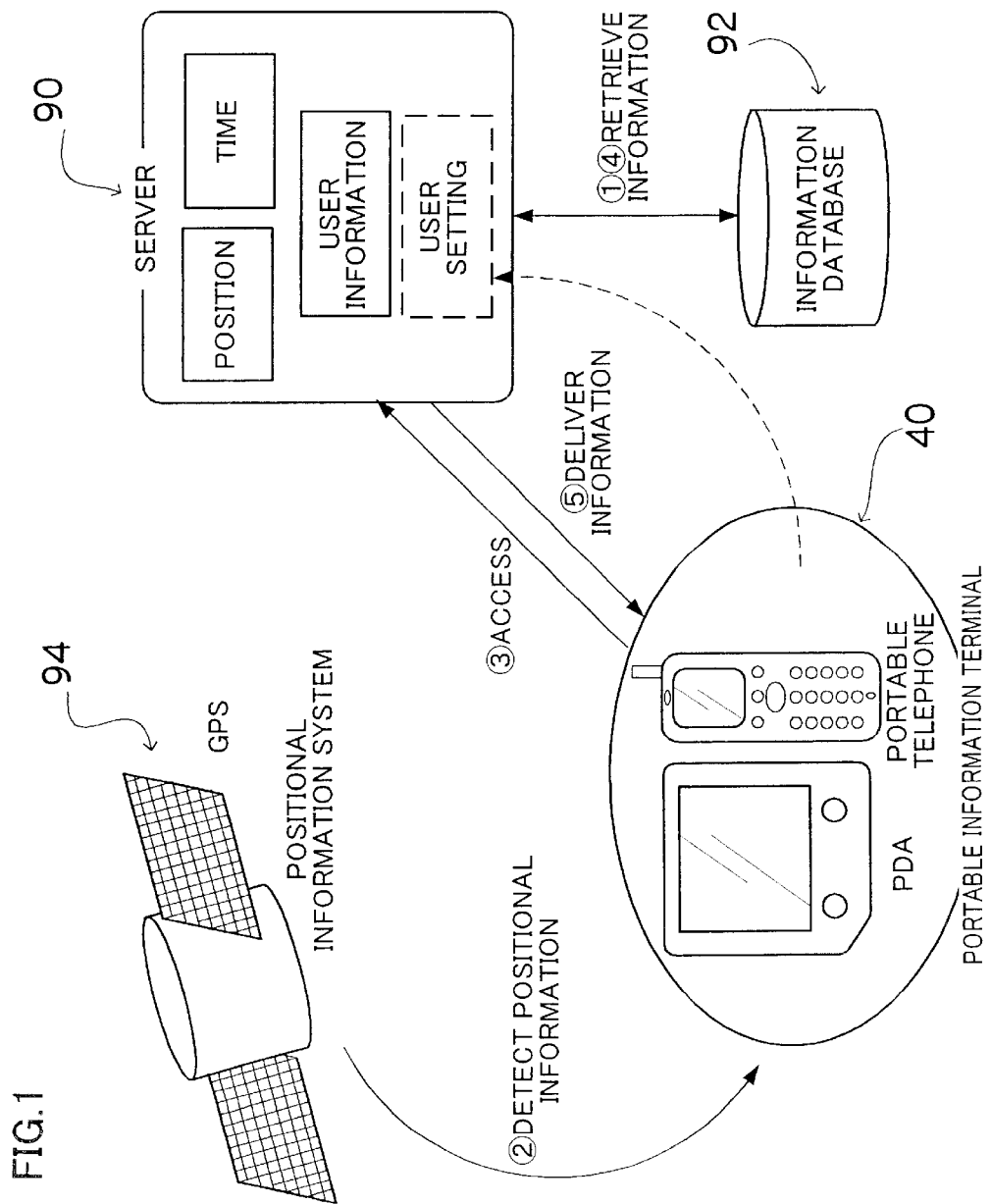
FIG. 1 is a view of a structure of an information notification system according to the invention.

FIG. 1 is a view of a structure of an information notification system according to the invention.

In the drawing, the information notification system comprises a portable terminal 40 (indicated as a portable information terminal in FIG. 1) such as a PDA or portable telephone carried by a user; a server 90 which can transmit and receive information to and from the portable terminal 40 via a communication network such as a public line; an information database 92 from and on which the server 90 can read and write various kinds of information; and a position detecting device 94 such as a GPS (Global Positioning System) which can detect a current position of the portable terminal 40 (a GPS satellite is indicated as a position information system in FIG. 1).

The portable terminal 40 is provided with an input device through which the user inputs his profile (user information) such as a sex, birthday, an age or occupation, and notification time of service information or a notification time interval of the service information; a display device which displays various kinds of service information and notifies the user; and a communication device which wirelessly transmits and receives information to and from other communication device such as the server 90.

The portable terminal 40 may be provided with a position detecting device which detects a current position of the user according to positional information transmitted from the GPS satellite, or a position detecting device which detects positional information on a communication base station nearest the portable terminal 40.

The server 90 is provided with a recording device which records service information on shops or the like associated with the positional information, and the profile information on the sex, age or occupation of the user; and a retrieving device which retrieves and selects the service information on the shops or the like recorded in the recording device. For notifying the user of timely and appropriate service information, the recording device may record the service information on the shops or the like at a predetermined time or time period, and the retrieving device may retrieve and select timely service information.

The server 90 may be provided with a position detecting device which detects the current position of the user, or an input device through which an owner of the shop or the like inputs the service information or the like on the shops or the like to be notified to the user. The service information inputted by the owner is recorded in a recording device such as the information database 92.

The object of the invention can be attained even if the input device through which the owner inputs the service information or the information on the shops to be notified to the user is a keyboard or the like provided in an owner's personal computer having a communication device capable of transmitting and receiving information to and from the server 90. The service information or the like inputted by the owner is transmitted through a communication device of the personal computer and a communication device of the server 90, and is recorded on a recorder such as the information data base 92 or the like.

In this way, shop information or the like obtained from each shop or the like can be recorded in the information database 92 associated with the profile for retrieval and the positional information of the user. By registering each user in the server 90, the information notification system can select information matching user's wish from the information database 92 and transmit the information to the portable terminal 40 for notifying the user.

The present invention is an information notification system for a mobile device (portable terminal) which can notify the user of closer and more appropriate information by using the positional information of the portable terminal 40 in addition to the time and profile with taking full advantage of the features of the portable terminal 40.

Figure 2:
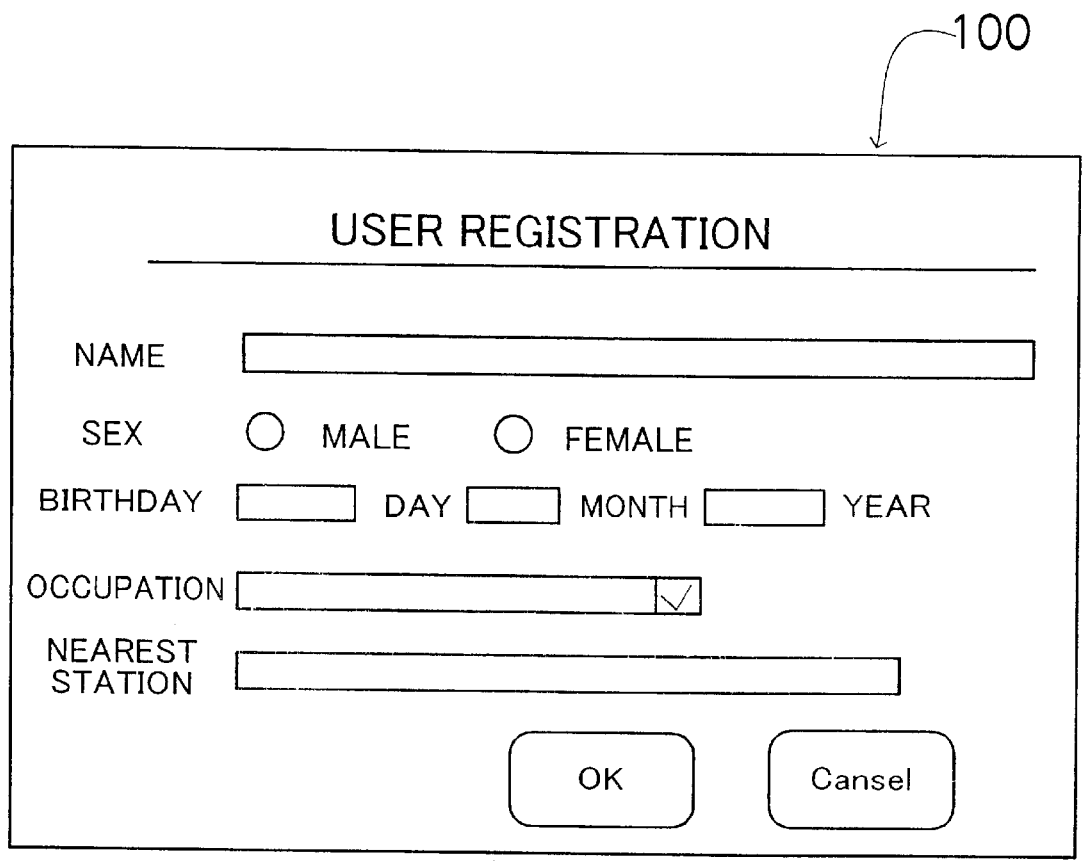
FIG. 2 is a view of a registration screen when a user registers his profile.

FIG. 2 shows an example of a registration screen when the user registers his profile.

When the user set a mode for registering the user information, the display device of the portable terminal 40 displays a profile registration screen 100 shown in the drawing (indicated with a title "USER REGISTRATION" in FIG. 2).

In the drawing, the registration screen 100 includes a blank to be filled with the name of the user; a blank to be filled with the sex and birthday which can be used for calculating the age of the user; a blank to be filled with the occupation of the user; a blank to be filled with information on a station nearest the user's home or current position of the user; an OK button which instructs registration of the inputted profile; and a cancel button which cancels the inputted profile.

In the first use of information notification service, the user operates the input device provided in the portable terminal 40 and inputs the profile such as the name, sex, age, birthday, nearest station, occupation, or preference according to a menu displayed on the display device. The profile inputted in this way is transmitted to the server 90 through a wireless communication device.

The server 90 having received the profile from the portable terminal 40 records the profile and information for identifying the portable terminal 40 of the user in the information database 92 (or a recording device such as a hard disk provided in the server 90) as required.

FIG. 3 shows a display example of a received information selection screen on which the user selects desired information when using the information notification system.

In the drawing, the received information selection screen 102 includes a menu of information on shopping, movie, restaurant, pub, entertainment, timetable, or the like which can be provided by the information notification system; check boxes which are selectively checked by the user when wishing to receive the respective providable information; an input box in which the user inputs how many hour interval the user wishes to receive the checked providable information; an OK button for instructing a start of the service of the inputted desired information; and a cancel button for canceling the inputted desired information.

The user checks the check box of the desired information when wishing to start using the information notification service by the information notification system. Then, the service information on the shops or the like in accordance with the profile is read from the information database 92 and transmitted to the portable terminal 40 to be notified the user. As choices of the providable information displayed on the received information selection screen 102, different menus are displayed depending on the profile such as the age or sex. This permits easily selecting the information desired by the user from the choices narrowed to some extent.

The user selects items of the desired information from the providable menu and checks the OK button for instructing the start of the service, and thus the checked information is transmitted to the server 90, and the server 90 reads the service information concerned from the information database and transmits to the portable terminal 40 for notifying the user. If time information is inputted in the item "TRANSMIT AT__HOURS INTERVAL", the service information is transmitted from the server 90 to the portable terminal 40 at the interval of inputted hours.

Figure 4:
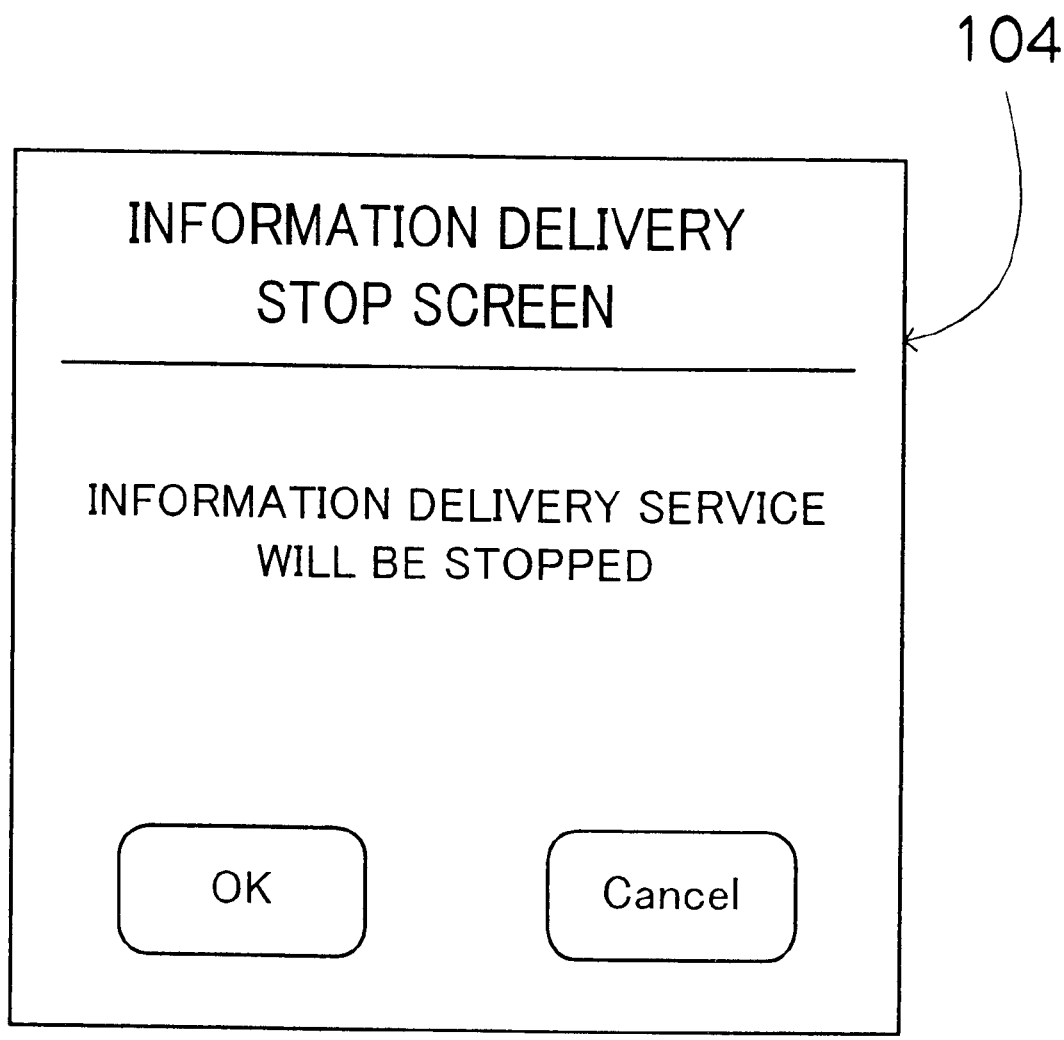
FIG. 4 is a view of information delivery stop screen.

When a stop of the service of the information notification system is wished by the user during use of the service, an information delivery stop screen 104 which is shown in FIG. 4 is displayed on the display device of the portable terminal 40. When the user checks the OK button in the information delivery stop screen 104, the server 90 stops delivery of the service information.

For example, when the user is a female office worker in her twenties, service information on clothes shops targeted at young females or cafes is retrieved and read from the information database 92 and automatically transmitted to the portable terminal 40 to be provided to the user. When determined that the user is a male teenage student from the profile, service information on clothes shops targeted at young males or game arcades is retrieved and read from the information database 92 and automatically transmitted to the portable terminal 40 to be provided to the user. When shops or the like are introduced to the user, service information concerning transportation such as the nearest station or railroad timetable may be notified together to surely guide the user.

Figure 5:
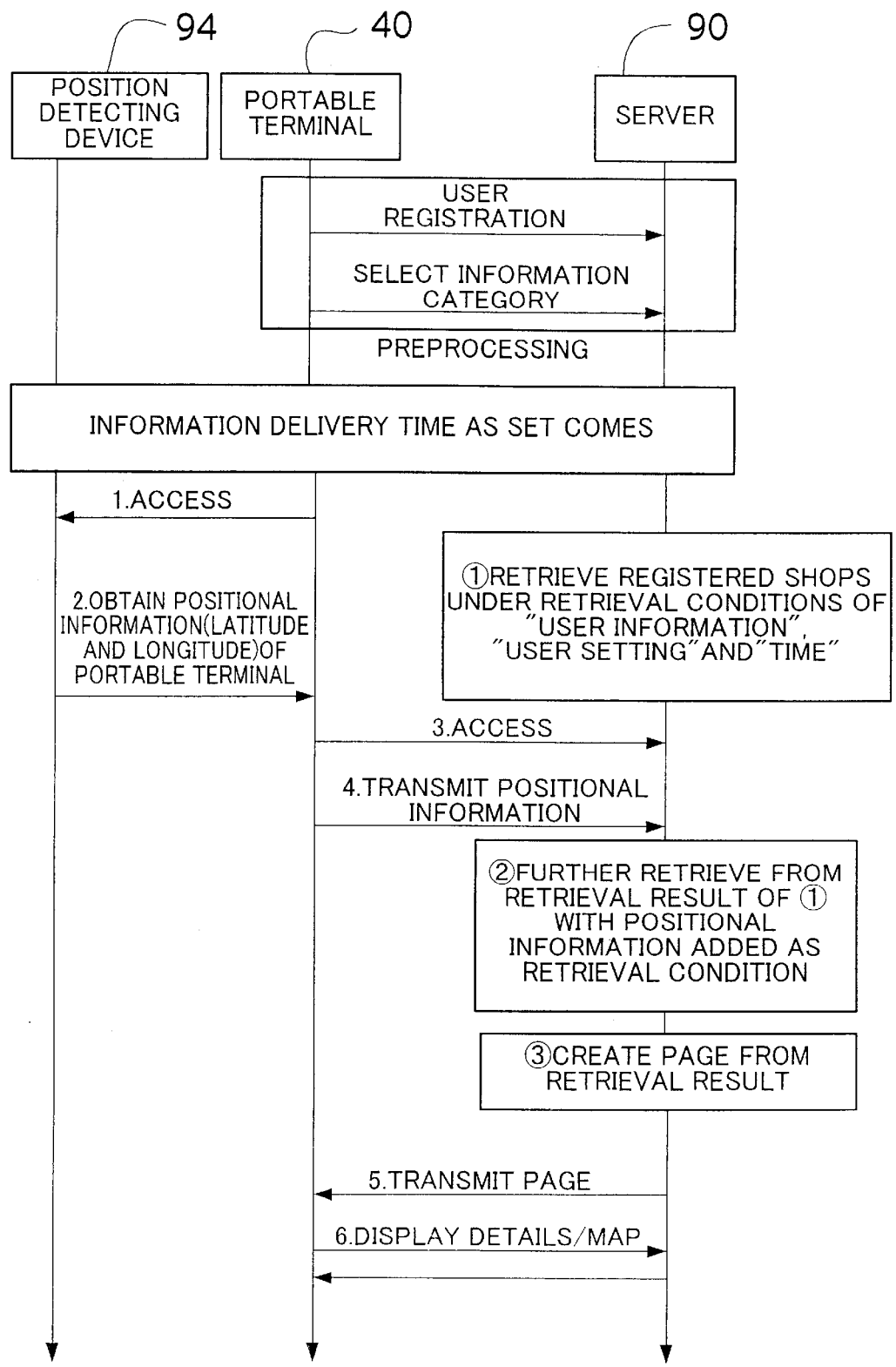
FIG. 5 is a flowchart of information notification carried out by the information notification system.

FIG. 5 is a flowchart of information delivery carried out by the information notification system.

As shown in the drawing, the user previously inputs his profile in the portable terminal 40 and carries out user registration to the server 90. Then, the user inputs the desired information in the portable terminal 40 and selects a category of information, and the portable terminal 40 transmits the inputted desired information and time interval of service information notification to the server 90. Preprocessing of the registration is thereby finished.

Then, when the time of service information notification set by the user comes, the position detecting device starts processing of detecting the current position of the portable terminal 40. For example, when the GPS is used to obtain the positional information of the portable terminal 40, a radio wave emitted from the GPS satellite is received and analyzed to obtain the positional information (latitude, longitude, height) of the portable terminal 40. When the portable terminal 40 is a mobile telephone such as a PHS, the current position of the portable terminal 40 may be detected according to positional information of the communication base station with which the PHS communicates.

When the time of the service information notification set by the user comes, the server 90 starts retrieval of matching shops, registered shops or the like from various kinds of information recorded in the information database 92 with the profile, desired information inputted by the user, and time designated as retrieval conditions.

At this time, the server 90 retrieves information on shops which belong to the category of the desired information selected by the user, and retrieves service information matching the profile, and shops or the like which are open or can accept the user at present.

Next, the portable terminal 40 having obtained its own positional information starts access to the server 90 and transmits the obtained positional information of the portable terminal 40 to the server 90. The server 90 having obtained the positional information of the portable terminal 40 further carries out narrow retrieval of the service information with the positional information of the portable terminal 40 added to the retrieval conditions. At this time, the server 90 having obtained the service information on the shops or the like which can provide service near the current position of the portable terminal 40 (for example, within 1 km radius) from the information database 92 as required creates a page for display from retrieval results, and the created page is transmitted to the portable terminal 40.

FIG. 6 shows the service information displayed by the portable terminal 40.

As shown in the drawing, the display device of the portable terminal 40 displays service information 106 selected by the information notification system. The service information 106 displays a list of shopping information and cafe information or the like according to the positional information of the portable terminal 40. The service information 106 displays top four shops or the like located near the portable terminal 40 from the desired information category selected by the user. The display on the service information 106 includes a brief list of telephone numbers, addresses, selling points, or the like of the shops or the like.

When wishing further detailed display or information, the user operates the input device such as a cursor key provided on the portable terminal 40 to select a "DETAILS" link button. Selection information of the "DETAILS" link button is then transmitted to the server 90, and the server 90 reads detailed information from the information database and transmits the information to the portable terminal 40. Then, the display device of the portable terminal 40 displays a details display 108 shown in FIG. 6, permitting further detailed information to be notified to the user.

When a "MAP" link button is selected in the service information 106, the display device of the portable terminal 40 displays a map display 110, permitting a route to the shop desired by the user to be notified to be the user. When an OK button is selected in each screen, display of the service information 106 is finished.

If power is not supplied to the portable terminal 40 at the predetermined communication time, or if the portable terminal 40 is located in a blind spot of wireless communication and the wireless communication with the server 90 cannot be carried out, the portable terminal 40 and server 90 attempt to communicate with each other, for example, at five minute interval. Further, if the portable terminal 40 and server 90 still cannot wirelessly communicate with each other after 15 minutes, the portable terminal 40 and server 90 stop delivery of the service information at that time and carry out processing of waiting for next service information transmission time.

FIG. 7 shows an owner registration page.

In each shop or the like, owner information on each shop is inputted from a browser of the personal computer connectable to the communication network such as the Internet for registration in the information notification system according to the invention. As shown in the drawing, an owner registration page 112 includes a box to be filled with a company name of the shop or the like; a box to be filled with a name (a person in charge); a box to be filled with an address of the shop; a box to be filled with information on a telephone number or fax number; a box to be filled with a password, or the like. When the owner of the shop finishes inputting various kinds of information in a form shown in FIG. 7, the inputted owner information is transmitted to the server 90 and recorded in the information database 92. When the server 90 finishes receiving and registering processings of the owner information, an owner ID and a password for confirmation are returned to the personal computer of the shop and displayed on a display screen of the browser.

By carrying out the owner registration as described above, even one owner can register information on a plurality of shops. When logging the server 90 in with the ID assigned by the owner registration, the browser screen of the personal computer displays a registered shop list display 114 shown in FIG. 8.

As shown in FIG. 8, the registered shop list display 114 displays owner ID information which identifies the owner of the shops or the like; a list of the registered shops including identification information on one or more shops (shop ID), names of the shop or the like, "DETAILS/CORRECT" buttons to be selected for detailed display or correction of the shop information, and "CANCEL" buttons for instruction of canceling the shop information; a button for instruction of confirmation and correction of the owner information; a new button for newly inputting shop information; an OK button; and a cancel button.

The owner of each shop or the like can confirm the detailed information on the registered shop, correct the information, or cancel the shop information from the screen of the registered shop list display 114. When the "DETAILS/CORRECT" link buttons or new button is pushed, a shop registration page 116 shown in FIG. 9 is displayed.

As shown in FIG. 9, the shop registration page 116 includes boxes to be filled with the owner ID information; name of the shop or the like; address of the shop or the like; information on the telephone number, fax number, URL or the like of the shop or the like; information on opening hours of the shop or the like; category information to which the shop belongs; information on features and service information or the like of the shop or the like.

The owner of the shop can input or cancel information on various kinds of shops in accordance with the display screen of the browser to transmit to the server 90 and confirm the information recorded in the information database 92.

When an owner information confirmation/correction button in the lower left is pushed in the registered shop list display 114 of FIG. 8, the owner registration page shown in FIG. 7 is displayed, where the owner information can be confirmed or corrected.

The information database 92 recording the shop information has tables prepared for the respective shops, and divides various kinds of data into the tables depending on the shop categories inputted in various kinds of forms shown in FIGS. 7 to 9. Besides the information inputted in the forms, the ID of the shop or the like, the latitude and longitude of the position of the shops determined by the address of the shop or the like, and map information around the shop are added to elements of the various kinds of data.

The above description is made in respect of an example of the structure where the information notification system according to the invention includes the portable terminal 40 and server 90. However, the present invention is not limited to this, and the object of the invention can be attained when the portable terminal 40 is provided with an input device for inputting a profile; a position detecting device; a recording device which previously records service information on shops or the like associated with a current position of a user and profile information on a sex, an age or occupation of the user; a retrieval device for retrieving and selecting the service information on the shops or the like recorded in the recording device according to the inputted profile and the detected current position of the user; and a display device which displays the selected service information and notifies the user.

As described above, according to the information notification system and the method thereof of the invention, there are provided a first input device through which the user inputs his profile such as the sex, birthday or occupation; the position detecting device which detects the current position of the user; the recording device which previously records the service information on the shops or the like associated with the current position of the user and the profile information on the sex, age, occupation of the user; the retrieving device which retrieves and selects the service information on the shops or the like recorded in the recording device according to the inputted profile and the detected current position of the user; and the display device which displays the selected service information and notifies the user, thereby permitting providing appropriate service information required by the user to the user by a push type information notification system.

Also, the push type information notification system of the invention permits reduction of complicated input of information in the portable terminal. Further, when the user retrieves the desired information on the shop or the like, the time and positional information of the user are included in the retrieval conditions, thereby permitting information notification with taking full advantage of features of the portable device.

Next, a preferred embodiment of a navigation system and a method thereof according to the invention will be described in detail.

Figure 10:
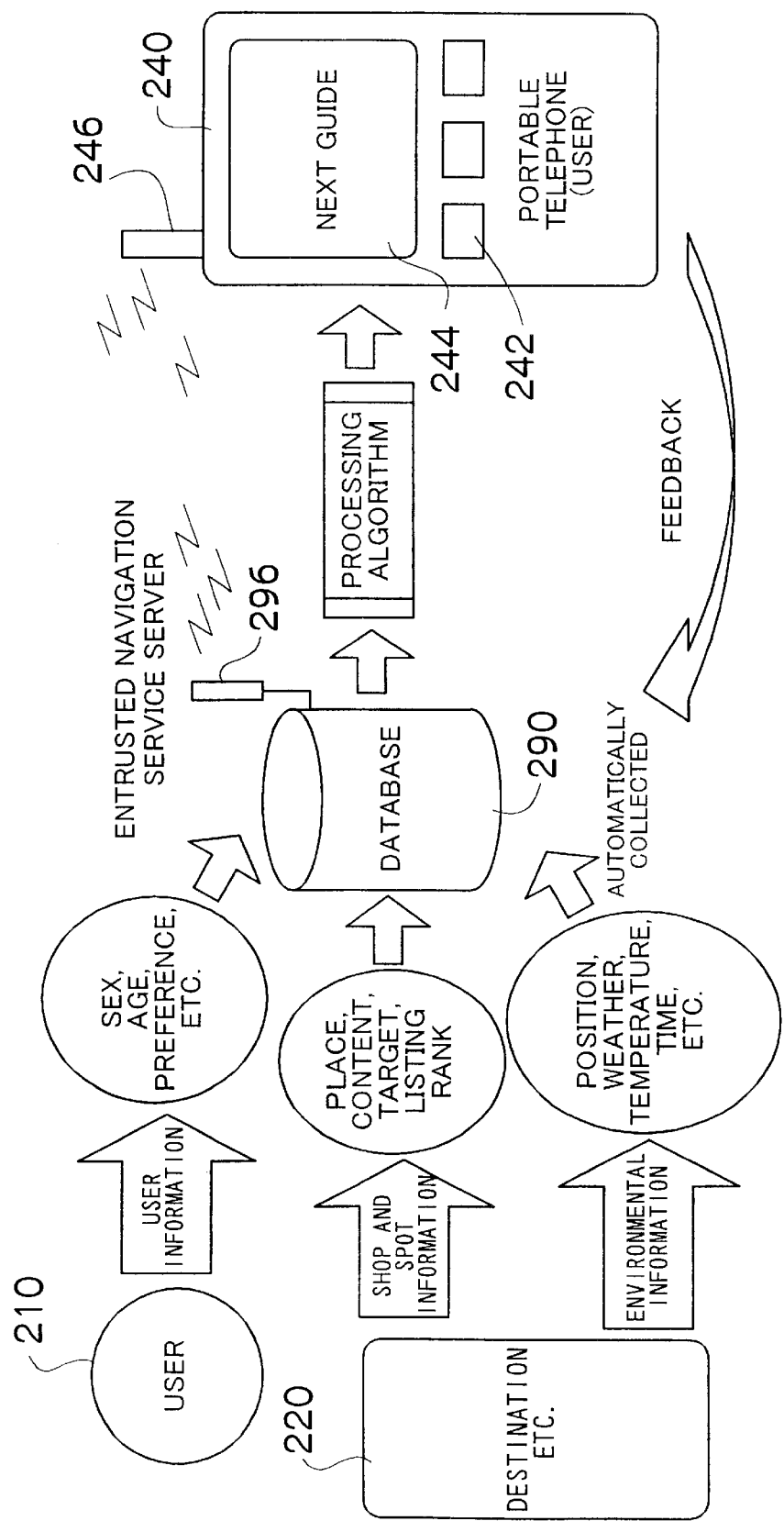
FIG. 10 is a view of a structure of a navigation system according to the invention.

FIG. 10 shows a structure of the navigation system according to the invention.

In the figure, the navigation system which guides a user 210 to a future destination 220 comprises a portable telephone 240 which is a kind of a portable terminal carried by the user 210, and a server 290 which stores user information on the user 210 and information on the destination 220.

The portable telephone 240 is provided with input device 242, 242 . . . in which the user inputs the user information on his profile of an age, a sex or preference, or a purpose or the like; a display device 244 (notification device) which displays information concerning the destination 220 or route and guides and notifies the user 210; and a wireless communication device 246 which can transmit and receive information to and from another communication device such as the server 290.

The server 290 is provided with a storing device such as a hard disk which previously stores the information on the destination 220 (such as "shop" or "spot") matching a date, time period, cost, number of persons, transportation, evaluation information, purpose or environmental information in action by the user 210, associated with the user information on the age, sex or preference of the user 210, and a processing device (an information processing device or the like when the server 290 is a computer) which selects the destination 220, a route, action information on an action order or the like associated with the user information on the profile or purpose of the user 210 from information on the destination 220 stored in the storing device according to a predetermined algorithm.

The server 290 is also provided with a communication device 296 which can transmit and receive information to and from the portable telephone 240, and can receive, from the destination 220, the user information on the age, sex, preference or purpose suitable for the user 210 to use the destination 220; the information on the date, time period, cost, number of persons, transportation, evaluation information, purpose, use fees for information notification of the destination 220, or the like in use associated with the user information; or information on the destination 220 such as transportation information on the route of the action by the user 210 or environmental information on weather information or the like on the route of the action by the user 210.

FIG. 11 shows an example of a user information database inputted by the user 210.

In the drawing, the user information includes information on a name, an address, age, a sex, portable telephone number, current position, hobby and preference of the user 210, and information on the purpose of travel or action desired by the user 210. When the user 210 operates the input device 242, 242 . . . of the portable telephone 240 and inputs the purpose of the action, the portable telephone 240 transmits the purpose information on the action by the user 210 to the server 290. At this time, personal information on the portable telephone number or name of the user 210 recorded in the recording device of the portable telephone 240 may be transmitted to the server 290 together with the purpose information on the user 210. The server 290 having received the user information stores the received information in the storing device as shown in FIG. 10.

The user 210 may previously register his personal information on the age, sex, and preference in the server 290 of the navigation system.

The current position of the user 210 is obtained by a position information obtaining device. For example, the position obtaining device may receive and stores the positional information directly inputted by the user 210 from the portable telephone 240, may obtain and store the positional information of the portable telephone 240 from the base station of the portable telephone 240, or may receive and store the positional information from the portable telephone 240 by providing the portable telephone 240 with a position detecting function of GPS (Global Positioning System), or the user 210 may receive and store the positional information of the user 210 from the destination 220, 220 . . . in use.

FIG. 12 shows a database of the destination information.

In the drawing, the destination information includes a name of each destination 220, 220 . . . , positional information on an address or the nearest station of the destination 220, 220 . . . , information on a preference or genre, information on a recommended suitable age bracket of the user 210, information on a cost range for use, user evaluation such as impressions obtained from those who used the destination before (impression information), information on an example of a using purpose recommended by the destination 220, 220 . . . , information on a recommended time period for use, and information on the number of persons.

These user information on the age, sex, preference, or purpose, and the information on the destination 220, 220 . . . in accordance with the date, time period, cost, number of persons, transportation, evaluation information, or purpose in the use associated with the user information are received by the communication device 296 (receiving device) provided in the server 290 and stored in the storing device.

The user evaluation information shown in FIG. 12 is feedback information inputted by the user 210 who used before the destination concerned through the portable telephone 240, the inputted information being transmitted from the portable telephone 240 to the server 290, and summarized by the information processing device of the server 290. The database of the destination 220, 220 . . . is changed whenever necessary in consideration of a crowing level, time service information, or the like, thereby it becomes possible to offer real time information.

Other detailed examples of the destination 220 include a shop, sightseeing spot, movie theater, concert venue, entertainment venue, theater, golf course, ski field, hot spring, amusement park, or the like.

FIG. 13 shows an environmental information database transmitted from the destination 220, 220 . . .

In the drawing, the environmental information records environmental items such as season, temperature, weather, crowding level, transportation information, or the like in each destination 220, 220 . . . For the environmental information, each destination 220, 220 . . . automatically and hourly transmits latest information to the server 290 to renew the environmental information database of the server 290.

FIG. 14 shows an example of calculated results of the destination to be notified to the user 210 calculated by the predetermined algorithm.

The user 210 inputs his profile such as the age, sex, preference, or purpose of the action, budget for the action, date of the action through the input device 242, 242 . . . of the portable telephone 240, and transmits to the communication device 296 of the server 290 through the communication device 246. The information processing device of the server 290 having received information on the profile or purpose of the action records the received information in the user information database. Then, the information processing device evaluates all the renewed user information database, destination database, and environmental information database to select the destination 220, 220 . . . most suitable for the user 210 who has made an inquiry from many registered destinations.

In the drawing, the calculation results of the destination 220, 220 . . . include the destination 220,220 . . . , user optimum evaluation, environment optimum evaluation, destination information, and evaluation value. A selected destination course menu is transmitted to the portable telephone 240 of the user 210 through the communication device 296.

The portable telephone 240 having received the destination course menu through the communication device 246 displays the received destination course menu on the display device 244 to notify the user 210.

Figure 15:
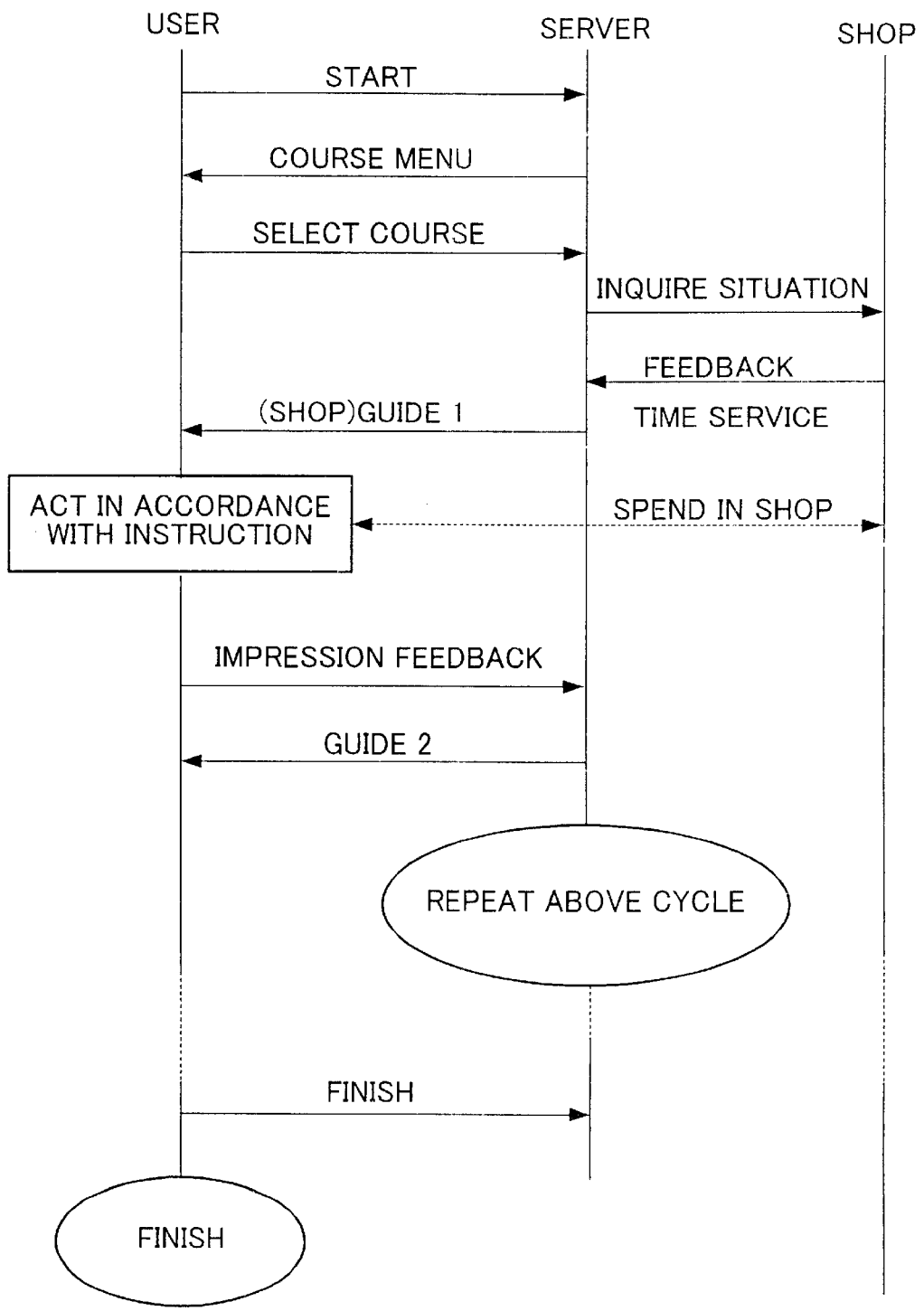
FIG. 15 is a flowchart when the user uses the navigation system.

FIG. 15 shows a flowchart when the user 210 actually uses the navigation system.

The user 210 inputs information on the budget, time, transportation, or the like concerning the purpose action or destination through the input device 242, 242 of the portable telephone 240. For example, when the user inputs "driving along the beach, romantic itinerary for couples" as purpose information, the purpose information inputted by the user is transmitted from the communication device 246 of the portable telephone 240 to the communication device 296 of the server 290 together with the information of "start".

The server 290 selects one or more next destinations (places, accesses, introduction to the destinations) in consideration of the preference of the user 210, current position, crowding level of transportation, time, weather, crowding level of the destination, according to all the information stored in the respective databases at that moment. The server 90 transmits "course menu" information concerning the plurality of destinations 220, 220 . . . to the portable telephone 240 to display on the display device 244 and notifies the user 210 for guiding.

The user 210 selects the desired destination 220 (sightseeing spot, shop or the like) from the information on one or more displayed destinations 220, 220 . . . Then, "course selection" information is transmitted from the portable telephone 240 to the server 290. The server 290 having received the information on the destination 220 selected by the user transmits "situation inquiry" information for requesting the selected destination 220 for the latest situation.

The destination 220 (shop) having received the "situation inquiry" information makes a response to the server 290 about "feedback" information on the latest time service information or crowding level.

The server 290 having received the "feedback" information transmits "(shop) guide 1" of the destination 220 according to the received "feedback" information to the portable telephone and displays on the display device 244. The user 210 having obtained the destination information takes action (such as going to the beach) according to the displayed guide, reaches the destination 220 and spends time.

As this embodiment, when the server 290 recognizes environmental information such that the route on the way is partly crowded, as a result of selection of the destination 220 corresponding to the purpose of going to the beach, the information processing device of the server 290 may provide information on restaurants or other sightseeing spots for avoiding the crowded point on the way to the destination.

A black box type display method like a wizard may be used in notifying the user of the route. If the user 210 does not wish to follow the guide information displayed on the display device 244 of the portable telephone 240, the user 210 may neglect the instruction. The information processing device of the server 290 may have a "rerouting" function of selecting a new destination or new action information on a route (an action order) according to the predetermined algorithm and notifying the user again, when the user 210 does not follow the displayed information, for example, the user is in a destination 220, 220 . . . different from the action information notified before in a predetermined time period.

When the destination 220 displayed on the display device 244 does not match user's intent, another destination 220, 220 . . . may be selected by returning to a top menu according to instruction of the user 210.

In this way, the user 210 reaches one destination after another in accordance with the guide displayed on the display device 244 of the portable telephone 240, achieves the purpose (swimming, eating, shopping, sightseeing, or the like) and requests the server 290 to guide a next destination. At this time, the server 290 may request the user 210 to input evaluation information on a situation of the destination or impressions for increasing the destination information of the server 290 (creating information on satisfaction ranking or the like).

When the user inputs information on satisfaction or the like through the portable telephone 240, the "impression feedback" information is transmitted to the server 290, and a user evaluation value is calculated and stored in the storing device. Then, a guide concerning the next destination 220 is transmitted from the server to the portable telephone 240.

As described above, by successively obtaining guides of destinations, the user 210 can achieve suitable purposes. When the user finishes using the navigation system after finishing desired actions, "finish" information inputted through the input device 242, 242 . . . is transmit to the server 290, and the series of processing of the navigation system is finished.

There may be provided a navigation system which collects use fees (listing fees) for notification from for-profit destinations 220, 220 . . . (such as shops) stored in the destination database, where a higher priority for selection is placed on a destination which pays a higher use fee when there is a slight difference between selection results of the destinations 220. For a method of collecting the use fees, use fees such as introduction fees may be received only from destinations 220, 220 . . . which are actually used.

The service provider may take a souvenir photograph in each destination 220 such as a sightseeing spot, and provide a picture image to the user. Also, game like elements may be added in such a manner that the user can obtain benefit when he collects photographs in all the destinations 220, 220 . . . like a stamp rally. Further, orienteering like elements may be added in such a manner that the taken photographs are printed in the last shop and handed to the user.

In the above embodiment, the description is made in respect of an example of providing the server 290 with the storing device which stores the destination information and the processing device which calculates the action information according to the predetermined algorithm. However, the invention is not limited to this, and the object of the invention can be attained when the devices are provided in the portable telephone 240.

As described above, according to the navigation system of the invention, there are provided the storing device which previously stores the destination information matching the date, the time period, the cost, the number of persons, the transportation, the evaluation information, the purpose or the like in the action by the user, associated with the user information on the age, the sex or the preference of the user; the input device through which the user inputs his profile such as the age, sex or preference; the processing device which selects the destination or the action information on the action order or the like associated with the inputted profile from the destination information stored in the storing device according to the predetermined algorithm; and the notifying device which notifies the user of the selected action information, thereby permitting successively notifying the user of destinations and action instructions when the user inputs a destination or purpose action in a portable terminal.

Further, according to the navigation method of the invention, the service server transmits the course menu of the purpose or budget to the portable terminal of the user, the user selects the desired course from the course menu and transmits the course selection information from the portable terminal to the service server, the service server selects the course which includes at least one destination such as the shop or the sightseeing spot in accordance with the predetermined algorithm according to at least the course selection information, and guides the user to the destination included in the selected course through the portable terminal of the user, thereby permitting notifying the user of the next action instructions.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An information notification system which notifies a user of service information according to a current position of the user and profile information of the user, the information notification system comprising:

a first input device through which the user inputs the profile information of the user;

a position detecting device which detects a current position of the user;

a recording device which previously records the service information associated with the current position of the user and the profile information of the user;

a retrieving device which retrieves and selects the service information recorded in the recording device according to the inputted profile information and the detected current position of the user; and a display device which displays the selected service information to notify the user.

2. The information notification system according to claim 1, wherein:

the recording device records the service information at one of predetermined time and a predetermined time period; and the retrieving device retrieves and selects timely service information.

3. The information notification system according to claim 1, wherein the profile information of the user includes at least one of a sex, a birthday and an occupation of the user.

4. The information notification system according to claim 3, wherein:

the recording device records the service information at one of predetermined time and a predetermined time period; and the retrieving device retrieves and selects timely service information.

5. The information notification system according to claim 1, wherein:

the first input device and the display device are provided in a portable terminal having a first communication device;

the recording device and the retrieving device are provided in a server having a second communication device; and the server and the portable terminal transmit and receive information to and from each other through the first and second communication devices.

6. The information notification system according to claim 1, wherein the service information includes at least information on a shop.

7. The information notification system according to claim 6, further comprising:

a second input device through which an owner of the shop inputs the service information, wherein the recording device records the service information inputted through the second input device.

8. The information notification system according to claim 7, wherein:

the first input device and the display device are provided in a portable terminal having a first communication device;

the recording device and the retrieving device are provided in a server having a second communication device;

the second input device is provided in a terminal having a third communication device;

the server and the portable terminal transmit and receive information to and from each other through the first and second communication devices; and the server and the terminal transmit and receive information to and from each other through the second and third communication devices.

9. The information notification system according to claim 8, wherein the position detecting device is provided in the portable terminal carried by the user, and detects a current position of the portable terminal according to positional information transmitted from a global positioning system (GPS) satellite.

10. The information notification system according to claim 1, wherein the position detecting device is provided in a portable terminal carried by the user, and detects a current position of the portable terminal according to positional information transmitted from a global positioning system (GPS) satellite.

11. An information notification system which notifies a user of service information according to a current position of the user and profile information of the user, comprising:

a first input device through which the user inputs the profile information of the user, and one of a notification time of the service information and a notification time interval of the service information;

a position detecting device which detects the current position of the user;

a recording device which previously records the service information associated with the current position of the user and the profile information of the user;

a retrieving device which retrieves and selects the service information recorded in the recording device according to the inputted profile and the detected current position of the user; and a display device which displays the selected service information to notify the user at the inputted one of the notification time and the notification time interval.

12. The information notification system according to claim 11, wherein:

the recording device records the service information at one of predetermined time and a predetermined time period; and the retrieving device retrieves and selects timely service information.

13. The information notification system according to claim 11, wherein the profile information of the user includes at least one of a sex, a birthday and an occupation of the user.

14. The information notification system according to claim 13, wherein:

the recording device records the service information at one of predetermined time and a predetermined time period; and the retrieving device retrieves and selects timely service information.

15. The information notification system according to claim 11, wherein:

the first input device and the display device are provided in a portable terminal having a first communication device;

the recording device and the retrieving device are provided in a server having a second communication device; and the server and the portable terminal transmit and receive information to and from each other through the first and second communication devices.

16. The information notification system according to claim 11, wherein the service information includes at least information on a shop.

17. The information notification system according to claim 16, further comprising:

a second input device through which an owner of the shop inputs the service information, wherein the recording device records the service information inputted through the second input device.

18. The information notification system according to claim 17, wherein:

the first input device and the display device are provided in a portable terminal having a first communication device;

the recording device and the retrieving device are provided in a server having a second communication device;

the second input device is provided in a terminal having a third communication device;

the server and the portable terminal transmit and receive information to and from each other through the first and second communication devices; and the server and the terminal transmit and receive information to and from each other through the second and third communication devices.

19. The information notification system according to claim 18, wherein the position detecting device is provided in the portable terminal carried by the user, and detects a current position of the portable terminal according to positional information transmitted from a global positioning system (GPS) satellite.

20. The information notification system according to claim 11, wherein the position detecting device is provided in a portable terminal carried by the user, and detects a current position of the portable terminal according to positional information transmitted from a global positioning system (GPS) satellite.

21. An information notification method of notifying a user of service information according to a current position of the user and profile information of the user, the method comprising:

inputting the profile information of the user;

detecting the current position of the user;

previously recording the service information in a recording device associated with the current position of the user and the profile information;

retrieving and selecting the service information recorded in the recording device according to the inputted profile information and the detected current position of the user; and displaying the selected service information to notify the user.

22. The information notification method according to claim 21, wherein the service information includes at least information on a shop.

23. The information notification method according to claim 21, wherein the profile information of the user includes at least one of a sex, a birthday and an occupation of the user.

24. The information notification method according to claim 23, wherein the service information includes at least information on a shop.

25. A navigation system comprising:

a storing device which previously stores destination information matching situational information in action by the user, associated with profile information of the user;

an input device through which the user inputs the profile information of the user;

a processing device which selects action information associated with the inputted profile information from the destination information stored in the storing device according to a predetermined algorithm; and a notifying device which notifies the user of the selected action information.

26. The navigation system according to claim 25, wherein the situational information includes at least one of a date, a time period, a cost, number of persons, transportation, evaluation information, a purpose in action by the user.

27. The navigation system according to claim 25, wherein the profile information of the user includes at least one of an age, a sex and a preference of the user.

28. The navigation system according to claim 25, wherein the action information includes at least one of a destination and an action order.

29. The navigation system according to claim 25, wherein the processing device selects a destination from a plurality of destinations in accordance with an amount of use fee for notification paid by each of the plurality of destinations.

30. The navigation system according to claim 25, wherein the destination information comprises environmental information including at least one of transportation information of a route of the action by the user, and weather information of the route of the action by the user.

31. The navigation system according to claim 25, wherein:

the storing device and the processing device are provided in a server having a first communication device;

the input device and the notifying device are provided in a portable terminal having a second communication device; and the server and the portable terminal can transmit and receive information to and from each other through the first and second communication devices.

32. The navigation system according to claim 31, wherein the server comprises a position information obtaining device which obtains positional information of the portable terminal.

33. The navigation system according to claim 32, wherein the processing device has a rerouting function of selecting, when the user is in a destination different from the action information notified before in a predetermined time period, at least one of a new destination and new action information according to a predetermined algorithm.

34. The navigation system according to claim 31, wherein the server comprises a position information obtaining device which obtains positional information of the user from the destination.

35. The navigation system according to claim 34, wherein the processing device has a rerouting function of selecting, when the user is in a destination different from the action information notified before in a predetermined time period, at least one of a new destination and new action information according to a predetermined algorithm.

36. The navigation system according to claim 25, further comprising:

a receiving device which receives, from the destination, user information suitable for the user to use the destination, and the destination information matching the situational information in use associated with the user information, wherein the storing device stores the received destination information.

37. The navigation system according to claim 36, wherein:

the storing device, the processing device and the receiving device are provided in a server having a first communication device;

the input device and the notifying device are provided in a portable terminal having a second communication device; and the server and the portable terminal can transmit and receive information to and from each other through the first and second communication devices.

38. The navigation system according to claim 37, wherein the server comprise a position information obtaining device which obtains positional information of the portable terminal.

39. The navigation system according to claim 38, wherein the processing device has a rerouting function of selecting, when the user is in a destination different from the action information notified before in a predetermined time period, at least one of a new destination and new action information according to a predetermined algorithm.

40. The navigation system according to claim 37, wherein the server comprises a position information obtaining device which obtains positional information of the user from the destination.

41. The navigation system according to claim 40, wherein the processing device has a rerouting function of selecting, when the user is in a destination different from the action information notified before in a predetermined time period, at least one of a new destination and new action information according to a predetermined algorithm.

42. The navigation system according to claim 37, wherein:

the situational information includes evaluation information of the destination;

the input device has a function through which the user inputs impressions on the used destination; and the storing device renews the evaluation information according to the inputted impression information.

43. The navigation system according to claim 36, wherein the user information includes at least one of an age, a sex, a preference, a purpose suitable for the user to use the destination.

44. The navigation system according to claim 43, wherein:

the storing device, the processing device and the receiving device are provided in a server having a first communication device;

the input device and the notifying device are provided in a portable terminal having a second communication device; and the server and the portable terminal can transmit and receive information to and from each other through the first and second communication devices.

45. The navigation system according to claim 44, wherein the server comprises a position information obtaining device which obtains positional information of the portable terminal.

46. The navigation system according to claim 45, wherein the processing device has a rerouting function of selecting, when the user is in a destination different from the action information notified before in a predetermined time period, at least one of a new destination and new action information according to a predetermined algorithm.

47. The navigation system according to claim 44, wherein the server comprises a position information obtaining device which obtains positional information of the user from the destination.

48. The navigation system according to claim 47, wherein the processing device has a rerouting function of selecting, when the user is in a destination different from the action information notified before in a predetermined time period, at least one of a new destination and new action information according to a predetermined algorithm.

49. The navigation system according to claim 44, wherein:
   the situational information includes evaluation information of the destination;
   the input device has a function through which the user inputs impressions on the used destination; and
   the storing device renews the evaluation information according to the inputted impression information.

50. The navigation system according to claim 25, wherein:
   the situational information includes evaluation information of the destination;
   the input device has a function through which the user inputs impressions on the used destination; and
   the storing device renews the evaluation information according to the inputted impression information.

51. A navigation system comprising:
   a storing device which previously stores destination information matching situational information in action by the user, associated with purpose information on a purpose of action by the user;
   an input device through which the user inputs the purpose information of the action;
   a processing device which selects action information associated with the inputted purpose information from the destination information stored in the storing device according to a predetermined algorithm; and
   a notifying device which notifies the user of the selected action information.

52. The navigation system according to claim 51, wherein the situational information includes at least one of a date, a time period, a cost, number of persons, transportation, evaluation information in action by the user.

53. The navigation system according to claim 51, wherein the profile information of the user includes at least one of an age, a sex and a preference of the user.

54. The navigation system according to claim 51, wherein the action information includes at least one of a destination and an action order.

55. The navigation system according to claim 51, wherein the processing device selects a destination from a plurality of destinations in accordance with an amount of use fee for notification paid by each of the plurality of destinations.

56. The navigation system according to claim 51, wherein the destination information comprises environmental information including at least one of transportation information of a route of the action by the user, and weather information of the route of the action by the user.

57. The navigation system according to claim 51, wherein:
   the storing device and the processing device are provided in a server having a first communication device;
   the input device and the notifying device are provided in a portable terminal having a second communication device; and
   the server and the portable terminal can transmit and receive information to and from each other through the first and second communication devices.

58. The navigation system according to claim 57, wherein the server comprise a position information obtaining device which obtains positional information of the portable terminal.

59. The navigation system according to claim 58, wherein the processing device has a rerouting function of selecting, when the user is in a destination different from the action information notified before in a predetermined time period, at least one of a new destination and new action information according to a predetermined algorithm.

60. The navigation system according to claim 57, wherein the server comprises a position information obtaining device which obtains positional information of the user from the destination.

61. The navigation system according to claim 60, wherein the processing device has a rerouting function of selecting, when the user is in a destination different from the action information notified before in a predetermined time period, at least one of a new destination and new action information according to a predetermined algorithm.

62. The navigation system according to claim 51, further comprising:
   a receiving device which receives, from the destination, user information suitable for the user to use the destination, and the destination information matching the situational information in use associated with the user information,
   wherein the storing device stores the received destination information.

63. The navigation system according to claim 62, wherein:
   the storing device, the processing device and the receiving device are provided in a server having a first communication device;
   the input device and the notifying device are provided in a portable terminal having a second communication device; and
   the server and the portable terminal can transmit and receive information to and from each other through the first and second communication devices.

64. The navigation system according to claim 63, wherein the server comprises a position information obtaining device which obtains positional information of the portable terminal.

65. The navigation system according to claim 64, wherein the processing device has a rerouting function of selecting, when the user is in a destination different from the action information notified before in a predetermined time period, at least one of a new destination and new action information according to a predetermined algorithm.

66. The navigation system according to claim 63, wherein the server comprises a position information obtaining device which obtains positional information of the user from the destination.

67. The navigation system according to claim 66, wherein the processing device has a rerouting function of selecting, when the user is in a destination different from the action information notified before in a predetermined time period, at least one of a new destination and new action information according to a predetermined algorithm.

68. The navigation system according to claim 63, wherein:
   the situational information includes evaluation information of the destination;
   the input device has a function through which the user inputs impressions on the used destination; and
   the storing device renews the evaluation information according to the inputted impression information.

69. The navigation system according to claim 62, wherein the user information includes at least one of an age, a sex, a preference, a purpose suitable for the user to use the destination.

70. The navigation system according to claim 69, wherein:
- the storing device, the processing device and the receiving device are provided in a server having a first communication device;
- the input device and the notifying device are provided in a portable terminal having a second communication device; and
- the server and the portable terminal can transmit and receive information to and from each other through the first and second communication devices.

71. The navigation system according to claim 70, wherein the server comprises a position information obtaining device which obtains positional information of the portable terminal.

72. The navigation system according to claim 71, wherein the processing device has a rerouting function of selecting, when the user is in a destination different from the action information notified before in a predetermined time period, at least one of a new destination and new action information according to a predetermined algorithm.

73. The navigation system according to claim 70, wherein the server comprises a position information obtaining device which obtains positional information of the user from the destination.

74. The navigation system according to claim 73, wherein the processing device has a rerouting function of selecting, when the user is in a destination different from the action information notified before in a predetermined time period, at least one of a new destination and new action information according to a predetermined algorithm.

75. The navigation system according to claim 70, wherein:
- the situational information includes evaluation information of the destination;
- the input device has a function through which the user inputs impressions on the used destination; and
- the storing device renews the evaluation information according to the inputted impression information.

76. The navigation system according to claim 51, wherein:
- the situational information includes evaluation information of the destination;
- the input device has a function through which the user inputs impressions on the used destination; and
- the storing device renews the evaluation information according to the inputted impression information.

77. A navigation method for guiding a user in accordance with a course provided by a service server with information being exchanged between a portable terminal of the user and the service server, said method comprising:
- transmitting a course menu from the service server to the portable terminal of the user;
- selecting by the user a desired course from the course menu and transmitting course selection information from the portable terminal to the service server;
- selecting by the service a course in accordance with a predetermined algorithm according to at least the course selection information; and
- guiding the user to the destination included in the selected courses,
- wherein said course menu comprises at least one of:
  - a course which is designated by a purpose comprising at least one of eating, drinking, shopping, and sightseeing; and
  - a course which is designated by a budget pertaining to a route taken in accordance with an instruction of said service server.

78. The navigation method according to claim 77, wherein:
- positional information of the user is obtained in the course selection; and
- a course which includes at least one destination associated with the obtained positional information of the user is selected.

* * * * *